United States Patent [19]

Hansson et al.

[11] 4,045,963
[45] Sept. 6, 1977

[54] UNDERGROUND INSTALLATION FOR STORING PETROL PRODUCTS

[75] Inventors: Bengt Hansson, Sollentuna; Sigfrid Svensson, Goteborg, both of Sweden

[73] Assignee: Armerad Betong Vägförbättringar Aktiebolag, Stockholm, Sweden

[21] Appl. No.: 689,378

[22] Filed: May 24, 1976

[30] Foreign Application Priority Data

May 28, 1975  Sweden .............................. 7506113

[51] Int. Cl.$^2$ .............................................. B65G 5/00
[52] U.S. Cl. .................................................... 61/.5
[58] Field of Search ............................ 61/.5; 137/236

[56] References Cited

U.S. PATENT DOCUMENTS

| | | | |
|---|---|---|---|
| 2,788,637 | 4/1957 | Benz | 61/.5 X |
| 3,068,654 | 12/1962 | Warren | 61/.5 |
| 3,084,515 | 4/1963 | Dougherty | 61/.5 |

Primary Examiner—Jacob Shapiro
Attorney, Agent, or Firm—Flynn & Frishauf

[57] ABSTRACT

The invention is connected with an installation or plant for storing oil and similar petrol products in several underground storing rooms each communicating with a common oil-filled pump chamber housing submersed pumps for pumping out oil from any of the rooms. Selective pumping requires valves for selective connection of room outlet pipes with a pump inlet pipe. Submersed location of those valves in the pump chamber, according to the prior art, involves several disadvantages such as the need of draining the complete system for repair and maintenance work on the valves, and, difficulty to remote-control the valves. These advantages are, according to the invention, eliminated by the use of a dry valve chamber sealed-off from an oil-containing pump chamber housing submersed pumps.

7 Claims, 4 Drawing Figures

UNDERGROUND INSTALLATION FOR STORING PETROL PRODUCTS

It is, since a long time ago, known to store petrol products, particularly crude oil, in storing rooms formed by rock blasting. In comparison with conventional containers on the surface of the ground such storing rooms exhibit several essential advantages, especially from an environmental and defense point of view and since the leakage risk can be considered completely eliminated. However, on the other hand, there arise certain special problems typical to installations of this kind. Among those problems we shall here deal with two only, that of installation costs and certain operational security aspects.

To take maximum advantage of the strength of the rock the ordinary location of such storing chambers is below the water table and at a depth below the top of the rock exceeding the span of the room. Each room, via a pipe shaft, communicates with the ground surface. The pipe shafts are provided with concrete barriers and are traversed by pipes through which the petrol products are introduced into and pumped out from the storing rooms. The pumping out of oil through such pipes is carried out by the use of pumps submersed into the oil. As is immediately understood, at least one such pump is needed for each storing room. However, since high capacity submersible pumps are very expensive the need of a large number of such pumps significantly increases the installation costs. This disadvantage is emphasized by the fact that only on very rare exceptional occasions does one pump out oil from two or more storing chambers simultaneously. In view of that fact it has been suggested instead to provide each rock chamber with a bottom pit from which the oil is through pipe conduits passed on to a pump chamber common to all of the storing rooms. That pump chamber is provided with a number of submersible pumps. Theoretically, it would even be possible to have one single submersible pump serving all of the storing rooms. However, under all circumstances the term "one single pump" as just used must then mean one single group of pumps, i.e. as many pumps connected in parallel as is necessary to reach the pumping-out capacity required. To illustrate the practical significance of that requirement it could be mentioned that a typical capacity is between 500 and 10,000 cubic meters per hour.

As is directly apparent from what has been said above, an installation of the type under discussion must comprise a pump or pump group, respectively, which can be selectively connected to the outlet pipe from each of the storing chambers of the installation. Accordingly, the pump chamber inlet pipes must be provided with valves by means of which the various storing chambers can be selectively connected to the pump chamber. Theoretically it would be possible to have the valves submersed in the pump chamber. However, in practice such a solution cannot be accepted. One reason is that the then necessary remote control of the valves would be very difficult. However, a far more important reason is that in order to carry out maintenance and repair work on the valves it would become necessary to drain off all of the oil stored in the complete installation.

For the reasons just discussed some prior art installations have both the valves and the pumps in a common dry chamber. The pumps may then be constituted by conventional "dry" pumps, i.e. they do not have to be submersible. The valves become easily accessible for repair and maintenance works. However, there does instead present itself another most serious disadvantage, the risk of explosion. The operation of the pumps requires electric motors and auxiliary equipment, such as switches. Since it is impossible completely to avoid oil leakage from the valves and from the rest of the pipe system in the pump chamber, such as connections and couplings, the air in such a pump chamber does always have some petrol vapour content. For that reason the pump chamber is provided with powerful venting devices. Nevertheless, under unfavourable conditions sparks generated in the electrical equipment may in such an atmosphere involve an explosion risk. For those reasons the authorities apply very restrictive security regulations.

SUMMARY OF THE INVENTION

The main object of the present invention is to provide a layout of an underground petrol product storing installation which results in an optimum solution of the problems involved both from an operational point of view and as far as the possibilities to carry out maintenance and other service works are concerned. Thirdly, also the total installation costs should be reduced. The invention is based on the realization that all of the requirements and desiderata above discussed can be satisfied if the valves are installed in a dry valve chamber and the pumps in an oil-containing chamber which is separated from the valve chambers. Both chambers are then common to two or more storing rooms having outlet pipes connected to the valve inlets. The outlet ends of the valves are connected to one or more pipes opening into the wet pump chamber.

One embodiment of the invention will now be described in greater detail, reference being made to the accompanying drawing. It should be pointed out that the drawing is diagrammatic in the sense that, in order to gain maximum surveyability, such components have been omitted which do not assist in the understanding of the invention.

BRIEF DESCRIPTION OF THE DRAWINGS

FIG. 5 illustrates a further feature of the invention.

DETAILED DESCRIPTION

Figure 1:
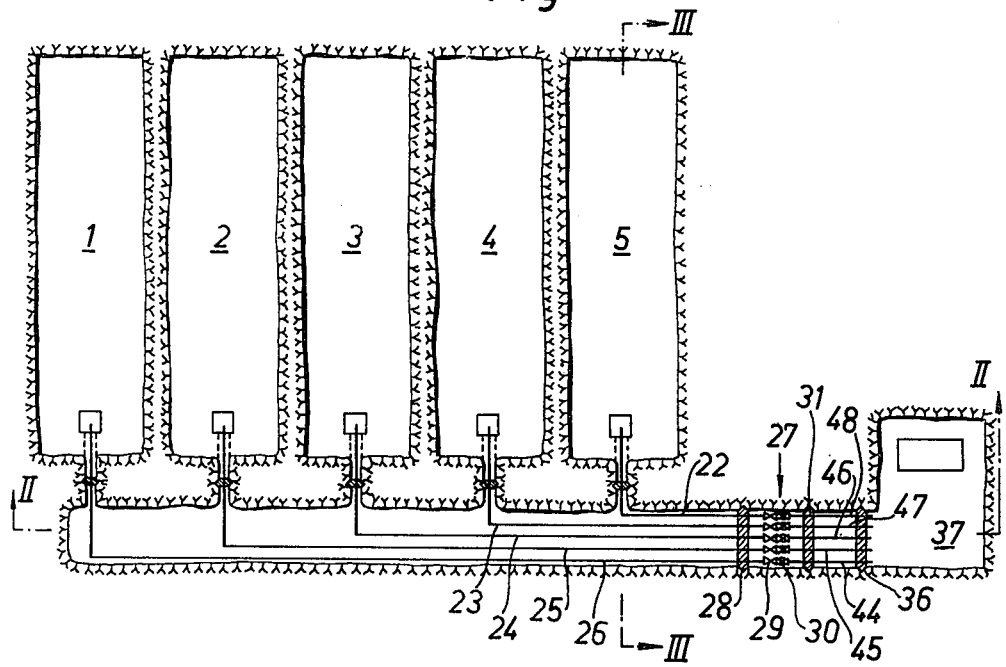
FIG. 1 is a plan view over an installation for the storing of petrol products. It consists of five separate storing rooms formed in rock by blasting.

The five storing rooms have been designated 1-5. From the top of each such room a pipe shaft 6 (FIG. 2) leads to the surface. Those shafts have concrete barriers 7 and 8. The shafts are traversed by a number of pipes —FIG. 3— one of which 10 is for the supply of oil into the room whereas the other two, 11 and 12, are connected to submersible pumps 13 for leakage water. The oil body 14 rests on a water bed 15 in the bottom of the room. Below shaft 6 there is a pit 16 also containing a bed of water. The pumps 13 are submersed in that water. The bottom orifice of pipe 10 is located slightly above the top surface of water bed 15 and the water therein is by a barrier 17 prevented from flowing down into pit 16. From the pit 16, a downwardly sloping tunnel 18 passes to a pipe tunnel 19. In tunnel 18 there is a concrete barrier 20 sealingly traversed by a pipe 21 the top end of which is located inside the oil body 14 and the bottom end of which is connected to a pipe 22. Pipe tunnel 19 contains four more pipes 23–26 each of which is connected to one of the other oil storing rooms 1–4.

Figure 2:
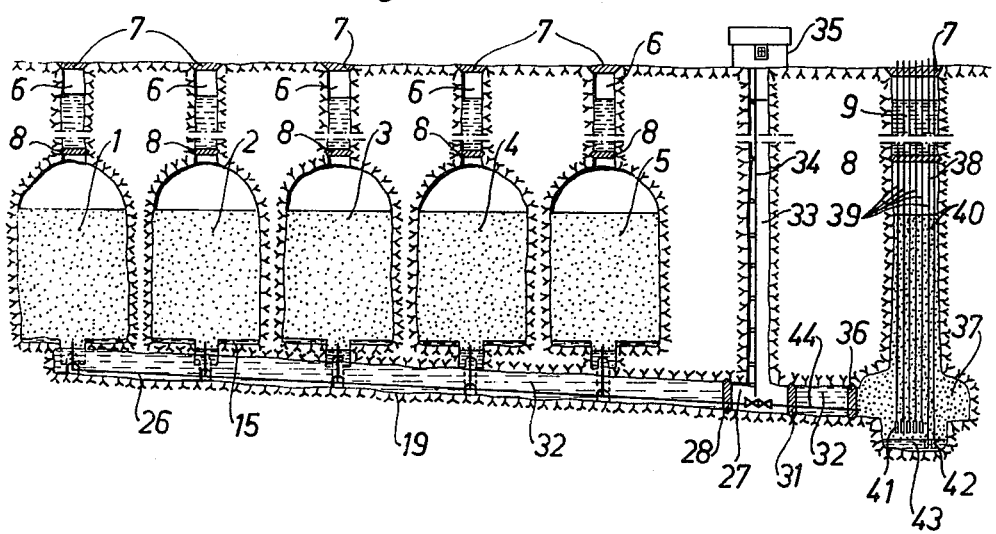
FIGS. 2 and 3 are sections taken along lines 2—2 and 3—3, respectively, in FIG. 1.
Figure 3:
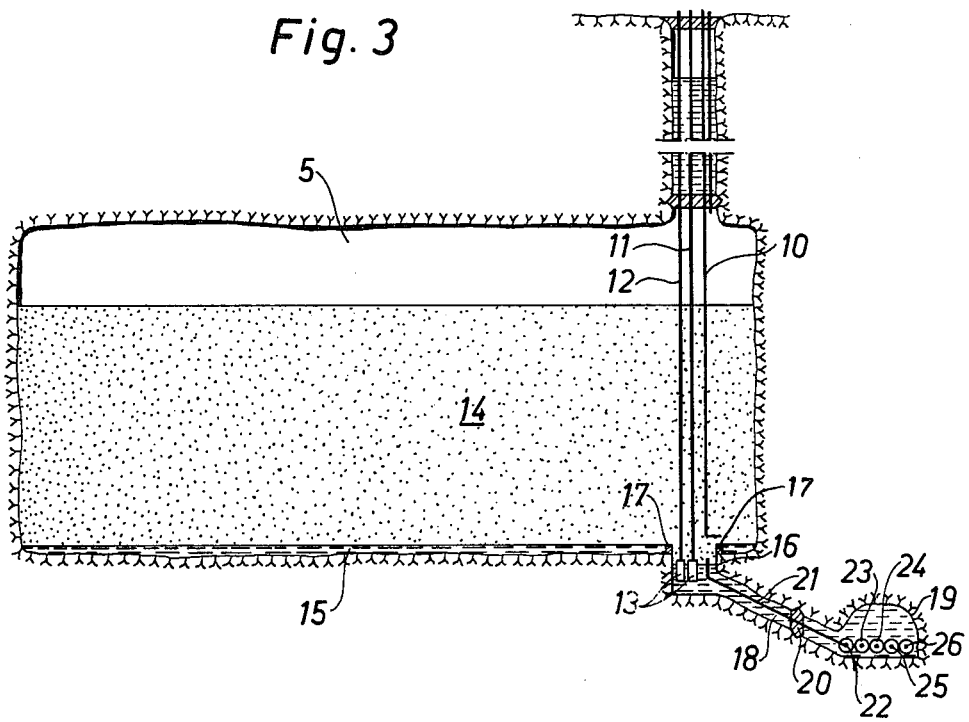
Figure 4:
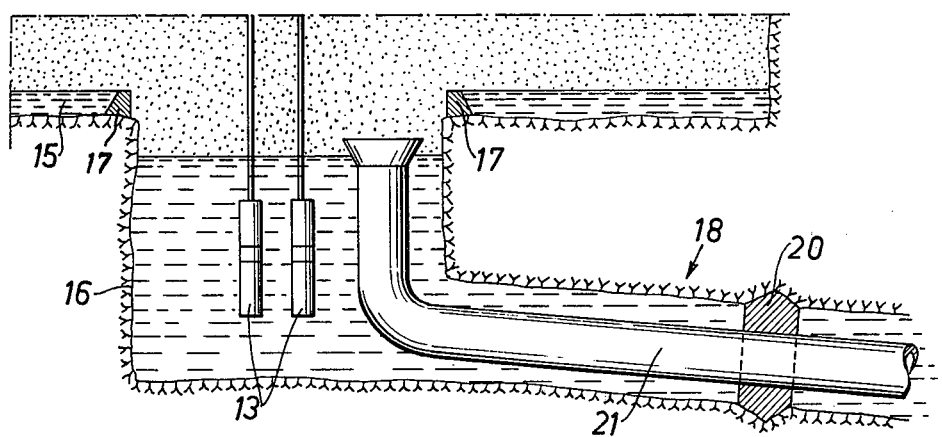
FIG. 4, on a larger scale, shows a vertical section through the bottom portion of an oil storing room.

As appears from FIG. 2, pipe tunnel 19 slopes from storing room 1 down towards a valve chamber 27. The transportation of the oil from the storing rooms to the valve chamber takes place by gravity. The five pipes 22–26, via a concrete barrier 28, pass into the valve chamber 27 inside which each pipe has two valves 29 and 30 connected in series. Valves 29 are manually controlled, whereas valves 30 are remote-controlled. Normally, valves 29 are kept open, the oil flow through the pipes being regulated by means of valves 30 which are remote-controlled from a control room on the ground surface. Accordingly, if some malfunctioning should arise in valve group 30, making it impossible to close any of those valves, the oil flow through the corresponding pipe can instead be halted by means of the manually operated valve 29. Also downstream of the valves there is a concrete barrier 31 and the space outside that barrier contains ballast water 32. Valve chamber 27 is accordingly completely dry and by a pipe shaft 33 connected with the ground surface. Inside that shaft there is a ladder 34 the top end of which is inside a small house 35 surrounding the shaft orifice.

With the exception of the valve chamber 27 pipe tunnel 19 is in its entirety filled with ballast water. It extends to a concrete barrier 36 traversed by pipes 44–48 opening into a wet pump chamber 37 and forming a direct continuation of pipes 22–26. The pump chamber 37 is also provided with a pipe shaft 38 which contains concrete barriers 7 and 8 between which there are water bodies 9. The shaft 38 is traversed by a number of pipes 39 and 40. Pipes 39 are connected to submersed oil pumps 41. Pipes 40 are connected to submersed leakage water pumps 42 the purpose of which is to maintain the desired level of a water bed 23 at the bottom of the pump chamber 37. Pumps 41 are naturally used to pump out oil from the installation. As is seen, all of the pump chamber 37 is filled with oil and, in addition thereto, the oil body extends upwards inside pipe shaft 38. The top surface of the oil column in shaft 38 will naturally be in level with the top surface of the oil body in that storing room which via opened valves communicates with the pump chamber—a presupposition being of course that a steady condition has been obtained. As has already been mentioned, from valve chamber 27 the oil flows into pump chamber 37 via pipes 44–48 which in this case are direct continuations of pipes 22–26. However, according to other embodiments two or more valves may have a common outlet pipe.

According to a further feature of the invention as shown in FIG. 5 the vertical pipes 39 and 40 are surrounded by respective jackets 50, 51 extending from the ground surface down to a level immediately above pumps 41 and 42. In this way it has been made possible to raise one of the pumps up to the ground level for the purpose of carrying out service work while maintaining the other pumps in operation.

It is understood that an installation according to the invention satisfies all the requirements and desiderata above described. The need for providing each storing room with its own set of pumps has been eliminated. Instead, the pumps serving all of the storing rooms are in a common pump chamber. That pump chamber is wet so that submersed pumps can be used whereby the explosion risk has been eliminated as well. Thirdly, the valves are still conveniently available for service jobs because they are in a separate-dry-valve chamber. All in all this layout means a drastic reduction of the total installation costs since it is no longer necessary to over-dimension the pumping capacity.

What we claim is:

1. An installation for storing petrol products comprising:
   a plurality of underground storing rooms (1–5) for the petrol products,
   an underground pump chamber (37) filled with oil and containing at least one submersed pump,
   a dry underground valve chamber (27) disposed between the storing rooms (1–5) and the underground pump chamber (37) and containing valves (30),
   inlet pipes (22–26) connecting the storing rooms (1–5) to the inlets of said valves (30), and
   at least one outlet pipe (44–48) connecting the outlets of said valves (30) with said underground pump chamber (37).

2. An installation as claimed in claim 1 wherein said pump chamber (37) houses a number of submersible pumps (41, 42) having outlet pipes (39, 40) extending up to the ground surface, and comprising respective jackets (50, 51) surrounding said pump outlet pipes (39, 40) and extending up to the ground surface.

3. An installation as claimed in claim 1 comprising the same number of inlet pipes (22–26) as the number of storing rooms, each inlet pipe being associated with a respective storing room, and the same number of outlet pipes (44–48) as inlet pipes, each outlet pipe being associated with a respective inlet pipe.

4. An installation as claimed in claim 3 wherein said dry underground valve chamber (27) comprises at least one valve means coupling said inlet pipes to said outlet pipes.

5. An installation as claimed in claim 4 wherein said at least one valve means comprises a manually operated valve and a remotely operated valve connected in series.

6. An installation as claimed in claim 1 comprising a pipe shaft (23) connecting said dry underground valve chamber (27) with the ground surface to permit access to said underground valve chamber.

7. An installation as claimed in claim 1 wherein said pump chamber (37) houses a number of submersible pumps (41, 42) having outlet pipes (39, 40) extending up to the ground surface.

* * * * *

United States Patent and Trademark Office
CERTIFICATE OF CORRECTION

PATENT NO. : 4,045,963
DATED : September 6, 1977
INVENTOR(S) : Bengt HANSSON et al It is certified that error appears in the above-identified patent and that said Letters Patent are hereby corrected as shown below:

On the title page, add the following additional Assignee Company:

--SCANDIACONSULT INTERNATIONAL AB
Stockholm, Sweden--.

In the Abstract, line 1, "connected" should read -- concerned --.

Signed and Sealed this

Seventh Day of June 1983

[SEAL]

Attest:

DONALD J. QUIGG

Attesting Officer

Acting Commissioner of Patents and Trademarks